United States Patent [19]
Henriott et al.

[11] Patent Number: 6,133,528
[45] Date of Patent: *Oct. 17, 2000

[54] CABLE MANAGEMENT GROMMET

[75] Inventors: Jay M. Henriott, Jasper; Grover L. Miller, Chrisney; Chad M. Schnell, Jasper, all of Ind.

[73] Assignee: Kimball International, Inc., Jasper, Ind.

[ * ] Notice: This patent issued on a continued prosecution application filed under 37 CFR 1.53(d), and is subject to the twenty year patent term provisions of 35 U.S.C. 154(a)(2).

[21] Appl. No.: 09/111,291

[22] Filed: Jul. 7, 1998

Related U.S. Application Data

[60] Provisional application No. 60/058,311, Sep. 9, 1997.

[51] Int. Cl.[7] ........................................ H02G 3/18

[52] U.S. Cl. ................. 174/65 G; 174/65 R; 174/65 SS; 174/135; 16/2.1; 439/548

[58] Field of Search ............... 174/65 G, 65 R, 174/65 SS, 152 G, 153 G, 135, 151; 16/2.1, 108; 248/56; 439/548, 556

[56] References Cited

U.S. PATENT DOCUMENTS

| | | | |
|---|---|---|---|
| 1,697,814 | 1/1929 | Forbes . | |
| 3,424,856 | 1/1969 | Coldren | 174/153 G |
| 3,518,359 | 6/1970 | Trimble et al. | 174/153 G |
| 3,783,175 | 1/1974 | Timmons | 174/48 |
| 4,027,094 | 5/1977 | Philips | 174/48 |
| 4,289,924 | 9/1981 | Pearce, Jr. et al. | 174/152 G |
| 4,950,839 | 8/1990 | Quinn et al. | 174/48 |
| 5,071,143 | 12/1991 | Byerly et al. | 277/606 |
| 5,167,047 | 12/1992 | Plumley | 16/2 |
| 5,272,988 | 12/1993 | Kelley et al. | 108/50 |
| 5,442,141 | 8/1995 | Gretz | 174/153 G |
| 5,511,622 | 4/1996 | Thompson | 169/70 |
| 5,526,549 | 6/1996 | Mori et al. | 16/2 |
| 5,557,078 | 9/1996 | Holwerda | 181/208 |
| 5,567,916 | 10/1996 | Napiorowski et al. | 174/153 G |
| 5,777,274 | 7/1998 | Kawase | 174/153 G |

*Primary Examiner*—Kristine Kincaid
*Assistant Examiner*—Dhiru Patel
*Attorney, Agent, or Firm*—Baker & Daniels

[57] ABSTRACT

A cable manager grommet insertable into a cutout in a furniture panel, the cutout having an edge surface with a slot formed therein, the grommet having a transverse collar and a ridge extending therefrom, wherein the transverse collar lines the cutout edge surface, with the ridge inserted into the slot.

10 Claims, 2 Drawing Sheets

U.S. Patent	Oct. 17, 2000	Sheet 1 of 2	6,133,528
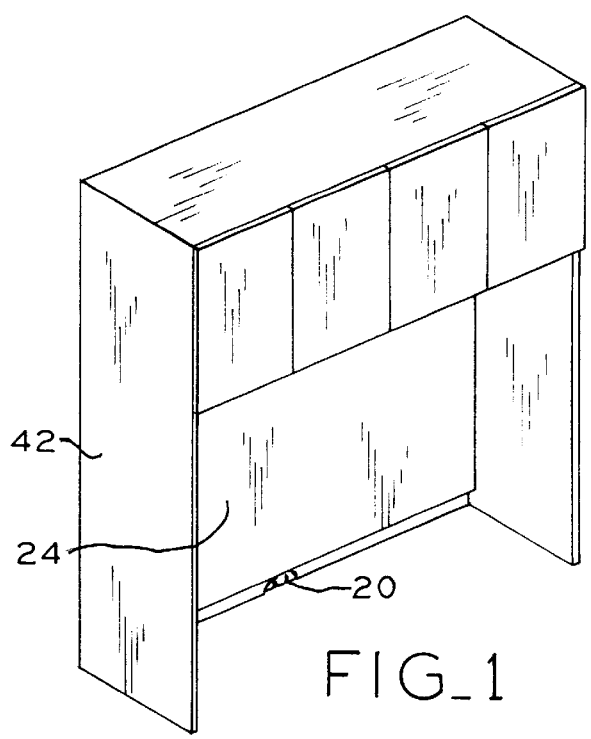
FIG_1
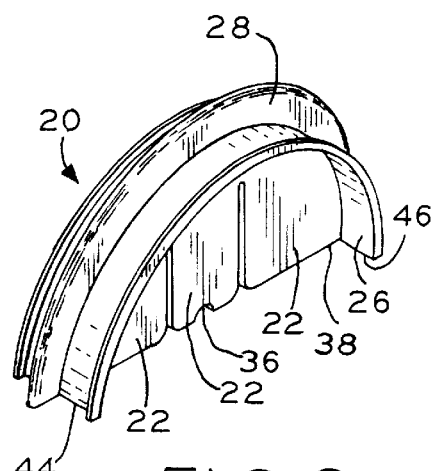
FIG_2
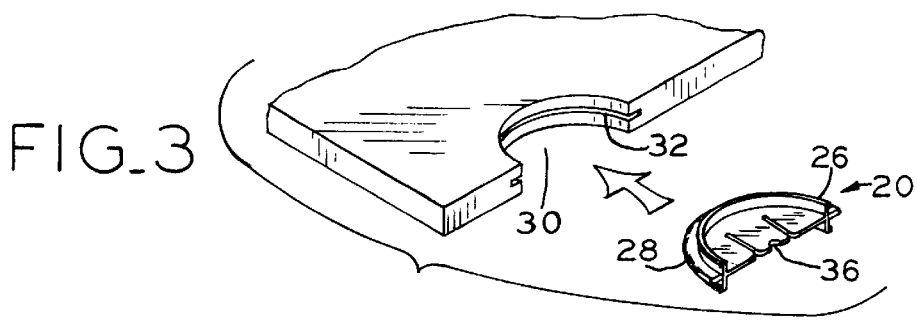
FIG_3
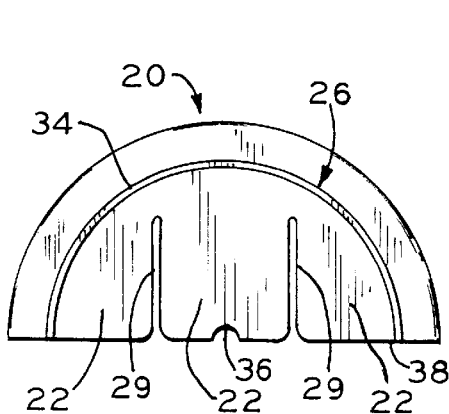
FIG_4
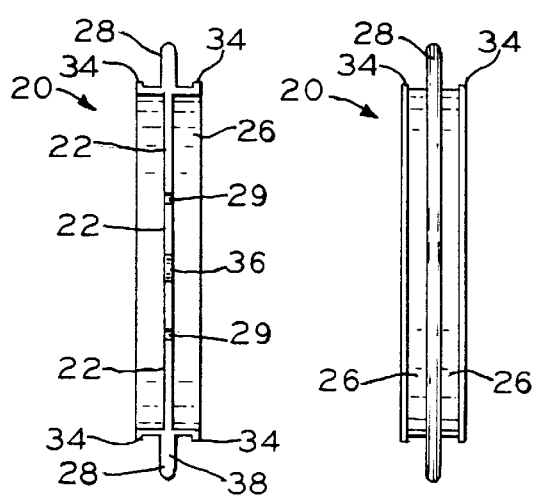
FIG_5   FIG_6

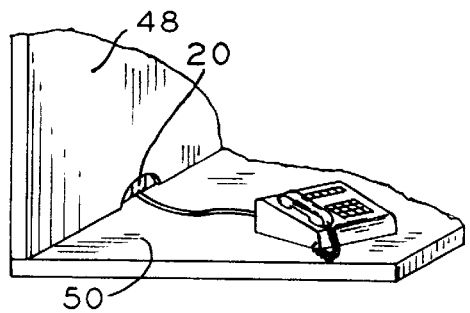
FIG_7
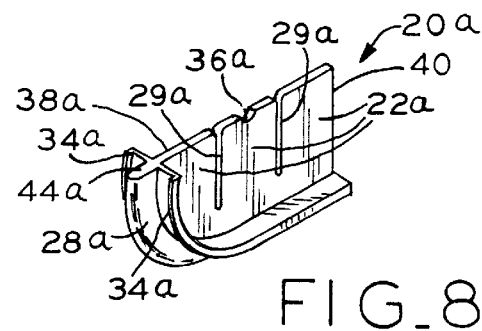
FIG_8
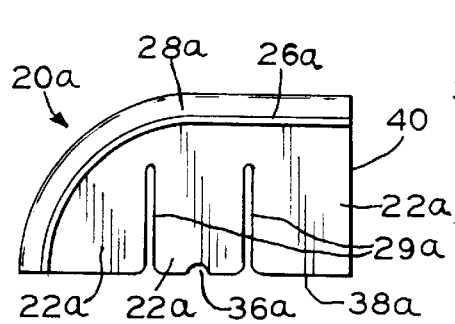
FIG_9
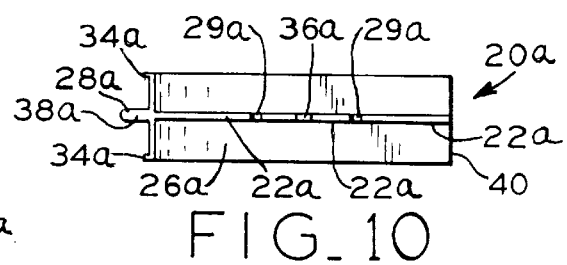
FIG_10
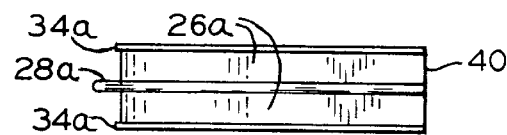
FIG_11
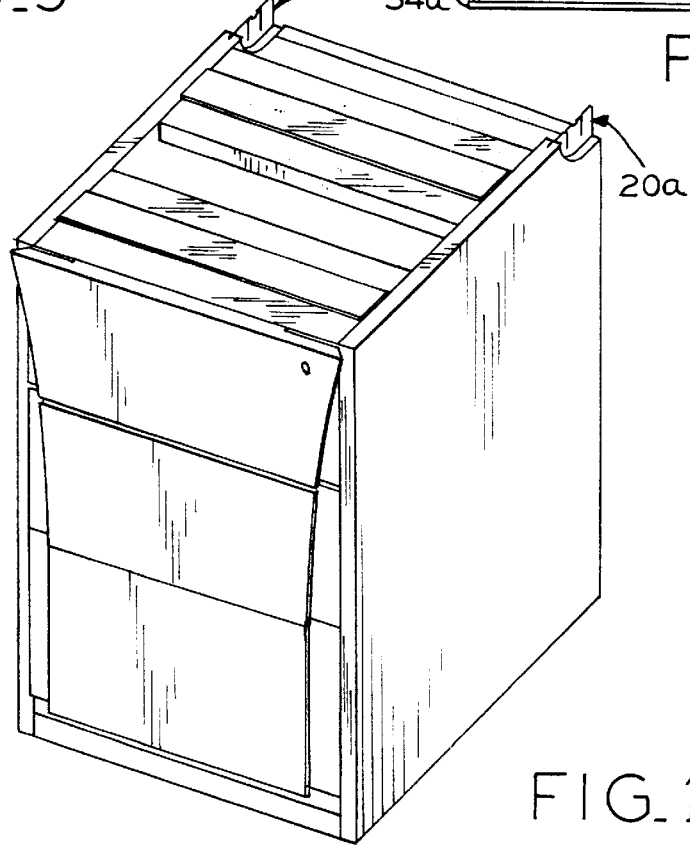
FIG_12

CABLE MANAGEMENT GROMMET

CROSS REFERENCE TO RELATED APPLICATIONS

This application claims the benefit under Title 35, U.S.C. § 119(e) of U.S. Provisional Patent Application Ser. No. 60/058,311, entitled STANDARDIZED FURNITURE SYSTEM AND METHOD OF MANUFACTURE, filed on Sep. 9, 1997.

BACKGROUND OF THE INVENTION

1. Field of the Invention

The present invention relates to furniture systems, and, more particularly, to standardized office furniture systems at which the user uses wired power and communication devices such as telephones, computers, calculators and the like.

2. Description of the Related Art

Office furniture manufacturers often provide passages through various surfaces of their furniture systems for accommodating the wires or cables of power and communications devices which, if not routed in some organized fashion, may be seemingly ubiquitous and unsightly. To further improve the aesthetics of the office, and to prevent small items from inadvertently passing through the cable passages, the passages are often provided with grommets through which the cables route and which partially cover the passage. Generally, these grommets allow the plug or connector of the wire to pass therethrough, but thereafter provide some means for closing about the wire proper. Previous cable managers have comprised individual, loose parts which may be easily disengaged from the passage and/or become lost. A cable manager comprising a single wire grommeting piece which is securely engaged to the passage is desirable.

SUMMARY OF THE INVENTION

To attractively permit the routing of power and communication cabling in and around furniture units in an organized manner, the present invention provides a cable manager grommet insertable into a cutout in a furniture panel, the cutout having an edge surface with a slot formed therein, the grommet having a transverse collar and a ridge extending therefrom, wherein the transverse collar lines the cutout edge surface, with the ridge inserted into the slot, whereby the engagement of the ridge and the slot secures the grommet to the furniture panel.

BRIEF DESCRIPTION OF THE DRAWINGS

The abovementioned and other features and objects of this invention, and the manner of attaining them, will become more apparent and the invention itself will be better understood by reference to the following description of embodiments of the invention taken in conjunction with the accompanying drawings, wherein:

FIG. 1 is a perspective view of a hutch incorporating a first embodiment of a cable management grommet according to the present invention;

FIG. 2 is perspective view of the grommet shown in FIG. 1;

FIG. 3 is an assembly diagram showing how the grommet shown in FIG. 1 is installed into a half-round bore provided in the edge of a panel;

FIG. 4 is a side view of the grommet shown in FIG. 1;

FIG. 5 is a bottom view of the grommet shown in FIG. 1;

FIG. 6 is a top view of the grommet shown in FIG. 1;

FIG. 7 is a fragmentary perspective view of a workstation in which the grommet shown in FIG. 1 is shown installed in a vertical panel adjacent a horizontal worksurface, with a cable running through the grommet;

FIG. 8 is a perspective view of a second embodiment of a cable management grommet according to the present invention;

FIG. 9 is a side view of the grommet shown in FIG. 8;

FIG. 10 is a bottom view of the grommet shown in FIG. 8;

FIG. 11 is a top view of the grommet shown in FIG. 8; and

FIG. 12 is a perspective view of a pedestal assembly in which two of the grommets shown in FIG. 8 are installed.

Corresponding reference characters indicate corresponding parts throughout the several views. Although the drawings represent embodiments of the present invention, the drawings are not necessarily to scale and certain features may be exaggerated in order to better illustrate and explain the present invention. The embodiments disclosed in the following detailed description are not intended to be exhaustive and are not to be construed as limiting the scope of the invention to the precise forms disclosed.

DESCRIPTION OF THE PRESENT INVENTION

Office furniture systems must be able to accommodate the ubiquitous power and communications cables found in the contemporary office. The management of these cables often requires routing cables through furniture panels near an edge thereof. One embodiment of a cable management device according to the present invention is semicircular cable management grommet 20 having a wall comprising flexible flaps 22 and which is shown in FIG. 1 installed in rear panel 24 of a hutch, which may be disposed atop a horizontal worksurface such as a desktop. Cable manager 20 is shown in greater detail in FIGS. 2–7 and includes a transverse semicircular collar 26 which is approximately 1.2 mm thick and has an inner radius of approximately 35.8 mm. Collar 26 has first and second ends 44 and 46, respectively. Semicircular ridge 28, having a thickness of approximately 3 mm, extends along the radially outer surface of the collar, axially centered between the collar's semicircular edges, and projects radially outward from the outer surface of collar 26 by approximately 7 mm. Cable manager 20 is provided with three flaps 22, as best seen in FIG. 4, separated by 2 mm wide slits 29 which may each be approximately 27 mm long. Centermost flap 22 may be approximately 22 mm wide. Cable management grommet 20 may be made of Santoprene or a similar material having a durometer value of between 80 and 85.

Cable manager 20 is installed in a half-round bore 30 located along the edge of a ¾ inch (approximately 19 mm) thick panel. Referring to FIG. 3, the semi-circular edge surface of bore 30 is provided with peripheral machined slot 32 centrally located between the opposite panel side surfaces, into which ridge 28 is press fitted to thereby secure cable manager 20 to the panel. Alternatively, cable manager 20 could be secured to bore 30 using adhesives or fasteners. Lips 34 extend about 1 mm radially outward from the outer radial surface of collar 26, at each of its semicircular outer edges, and lie adjacent the opposite side surfaces of the panel to help conceal the semicircular edge of bore 30. Cables are routed through cable manager 20 by simply flexing one or more flaps 22 out of the way and pressing the end of the cable, which may be provided with a plug, through the lower center portion of cable manager 20. As best shown in FIG. 4, at straight edge 38, centermost flap 22 may be provided with semicircular cutout or recess 36 through which a smaller diameter cable may be accommodated, surrounded by the edge of recess 36 and the adjacent surface against which edge 38 abuts. FIG. 7 shows cable manager 20 installed in a first vertical panel 48 adjacent a second horizontal worksurface, panel 50 a (telephone) cable running therethrough.

Although cable manager 20 is semi-circular in shape, alternatively shaped cable managers having flexible flaps inserted into correspondingly shaped cutouts along an edge of a panel could function in a similar manner. For example, cable management grommet 20a having first and second straight edges 38a and 40, respectively, is shown in FIGS. 8–12. Cable manager 20a functions in a similar manner to cable manager 20, and has correspondingly numbered features. Collar 26a has first and second ends 44a and 46a, respectively. Cable manager 20a can be installed in a cut-out at the corner of a panel, its first straight edge 38a abutting a first adjacent panel surface (not shown), its second straight edge 40 abutting a second adjacent panel surface (not shown), the first and second adjacent panels oriented perpendicularly to each other and to the panel in which grommet 20a is installed. For example, cable manager 20a can be located at the upper rear corners of a pedestal unit, as seen in FIG. 12, which may support an overlying horizontal worksurface and abut a vertical modesty panel or wall, as well as at numerous other locations.

While this invention has been described as having exemplary designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A cable manager grommet insertable into a cutout in a furniture panel, said cutout having an edge surface, a slot formed in said edge surface, said grommet having a transverse collar and a ridge extending from said collar, wherein said transverse collar lines said cutout edge surface, said ridge inserted into said slot.

2. The grommet of claim 1, wherein a partial bore through said furniture panel defines said cutout.

3. The grommet of claim 1, wherein said furniture panel has a side surface of the panel generally perpendicular to said cutout edge surface, said slot extending along said cutout surface and generally parallel to said side surface.

4. The grommet of claim 3, wherein said cutout forms an edge in said side surface and said transverse grommet collar has an outer edge on which is formed a lip, said lip overlying said edge in said side surface, whereby said edge in said side surface is concealed by said grommet lip.

5. The grommet of claim 1, wherein said grommet comprises a flexible wall adjacent and generally perpendicular to said collar, said wall having at least one flap formed therein.

6. The grommet of claim 5, wherein said collar extends longitudinally between first and second ends, said flexible wall extending between said first and second ends.

7. The grommet of claim 6, wherein said furniture panel is a first furniture panel, said grommet extending between said cutout edge surface and a side surface of a second furniture panel.

8. The grommet of claim 1, wherein said grommet is generally semicircular.

9. The grommet of claim 1, wherein said grommet ridge is press-fitted into said slot.

10. The grommet of claim 1, wherein said grommet is attached to said panel.

\* \* \* \* \*

UNITED STATES PATENT AND TRADEMARK OFFICE
CERTIFICATE OF CORRECTION

PATENT NO.   : 6,133,528
DATED        : October 17, 2000
INVENTOR(S)  : Jay M. Henriott et, al.

It is certified that error appears in the above-identified patent and that said Letters Patent is hereby corrected as shown below:

<u>Title page,</u>
Under the Assignee delete "Notice Section: This patent issued on a continued prosecution application filed under 37 CFR 1.53(d), and is subject to the twenty year patent term provisions of 35 U.S.C. 154 (a) (2)."

Signed and Sealed this

Second Day of October, 2001

Attest:

*Nicholas P. Godici*

NICHOLAS P. GODICI
*Attesting Officer*      *Acting Director of the United States Patent and Trademark Office*